United States Patent Office 3,704,309
Patented Nov. 28, 1972

3,704,309
METHOD OF PREPARATION OF SUBSTITUTED DIARYL OXALATES
Donald Roy Maulding, Branchburg Township, Somerset County, N.J., assignor to American Cyanamid Company, Stamford, Conn.
No Drawing. Filed Jan. 27, 1971, Ser. No. 110,295
Int. Cl. C07c 69/36
U.S. Cl. 260—479 S          8 Claims

ABSTRACT OF THE DISCLOSURE

Method for producing diaryl oxalates by reaction of tetrachloroethylene carbonate and substituted phenols. The aryl oxylate compounds obtain chemiluminescent light when reacted with other necessary chemiluminescent reactants in the direct generation of light from chemical energy. By "light" as referred to herein is meant electromagnetic radiation at wavelength falling between about 350 m$\mu$ and about 1,000 m$\mu$.

---

The invention herein described was made in the course of or under a contract with the Department of the Navy.

The present invention relates to a method for preparing compounds which obtain chemiluminescent light when reacted with other necessary chemiluminescent reactants in the direct generation of light from chemical energy. By "light" as referred to herein is meant electromagnetic radiation at wavelengths falling between about 350 m$\mu$ and about 1000 m$\mu$. More particularly, the invention relates to a method for preparing substituted diaryl oxalates by the reaction of tetrachloroethylene carbonate with substituted phenols.

The art of generating light from chemical energy, i.e. chemiluminescence, is continually in search of compositions which when reacted substantially improve the intensity and lifetime of light emission contrasted to known chemiluminescent compositions and reactions. Obviously, improved compositions are constantly in demand for use as signal devices, for area illumination, etc.

Various compounds have been known and proposed in the past for obtaining chemiluminescent light. One group is based on the compound tetramethylamino ethylene, reactive with oxygen. Such compounds must obviously be protected from air during storage.

Another group of compounds are bisaryl derivatives of oxalic acid. These compounds react with a peroxide in the presence of a solvent and a fluorescent compound to give chemiluminescent systems, they have the disadvantage that the oxalates are relatively expensive to prepare.

It is an object of this invention to provide a process for producing bisaryl oxalates which process is more economical than present processes.

Other objects of this invention become apparent from the above and following disclosure.

The term "aryl group" as used herein means a group which is derived from an aromatic compound by the removal of one or more atoms.

The term "chemiluminescent reactant," as used herein, means (1) a mixture which will result in a chemiluminescent reaction when reacted with other necessary reactants in the processes as disclosed herein, or (2) a chemiluminescent composition.

The term "fluorescent compound," as used herein, means a compound which fluorescence in a chemiluminescent reaction, or a compound which produces a fluorescent compound in a chemiluminescent reaction.

The term "chemiluminescent composition," as used herein, means a mixture which will result in chemiluminescence.

The term "admixing," as used herein, means "reacting" or sufficiently bringing together component reactants to obtain a chemiluminescent reaction.

The term "hydroperoxide compound" as used herein is limited to peroxide compounds having at least one HOO— group, or a compound which upon reaction produces a compound with such a group.

The term "peroxidic groups," as used herein, represents HOO—, R′OO—, or $$R'\overset{O}{\underset{\|}{C}}OO-$$

R is defined for the polycarbonyl compound below, while R″ is a substituent such as alkyl, cycloalkyl, $\alpha$-hydroxyalkyl, substituted alky, for example.

The term "diluent," as used herein, means a solvent or a vehicle which when employed with a solvent does not cause insolubility.

The term "peroxide compound," as used herein, also includes compounds which upon reaction produce the peroxide group.

The term "hydrogen peroxide compound" includes (1) hydrogen peroxide and (2) hydrogen peroxide-producing compounds.

The bisaryl oxalates of this invention are of the general formula

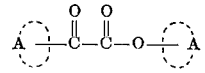

wherein

is an aryl radical such as phenyl or substituted phenyl.

The bisaryl oxalates of the present invention are prepared by the following representative reaction

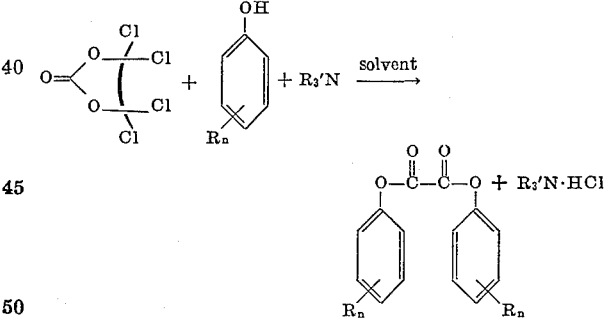

The letter $n$ represents an integer from 0 to 5. In this reaction, the R substituent of the phenol is an electronegative group, as defined by Edwin S. Gould in "Mechanism and Structure in Organic Chemistry," (pp. 220–227). The R substituents may be further defined as those having a positive Hammett sigma value. The Hammett sigma value is well known in the art and discussed in the following literature references:

"Ionization Constants of Acids and Bases," A. Albert and Sergeant, Mentheun and Co., London, 1962.

"Physical Organic Chemistry," L. P. Hammett, Mc-Graw-Hill Book Co., New York, 1940, pp. 251–290.

G. Kortum, W. Vogel and K. Andrussow, Pure Appln. Chem. 1187 (1960–61).

The Albert and Hammet references discuss theory and methods of measurement. Kortum shows a large number of measured pKa values.

References showing the use of Hammett sigma values are:

"Physical Organic Chemistry," L. P. Hammett, supra, pp. 186–197.

"Mechanism and Structure in Organic Chemistry," Edwin S. Gould, Henry Holt and Co., 1959, pp. 220–227.

H. H. Jaffe, "Reexamination of the Hammett Equation," Chem. Reviews, 53, pp. 191–261 (1953).

"Physical Organic Chemistry," Jack Hine, McGraw-Hill Book Co., New York, 1956, pp. 69–76.

Representative R substituents are as follows: —$CH_3$; —$CH_2CH_2CH_3$; —$CH(CH_3)_2$; —$C(CH_3)_3$; —$CH_2OH$; —F; —Cl; —Br; —$NO_2$; $CF_3$; —CN;

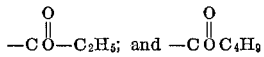

It will be understood that this is not intended to all possible substituents.

Substituted phenols within the scope of the invention are, for example, those having R substituents at the following designated positions: 4-nitro; 2,4-nitro; 2,4,6-trinitro; 4-cyano; 4-acetyl; 3-methoxy-4-formyl; 4-phenyl; 4-methoxy; 2,6-dimethoxy; 2,6-dimethyl; pentachloro; 3-trifluoromethyl-4-nitro; 2,4-dinitro-6-methyl; 2,4-dinitro-5,6-dimethyl; 2,4,6-trichloro; pentafluoro; 2-formyl-4-nitro; 3-trifluoromethyl; 3,5-trifluoromethyl; 2-nitro; 2,5-dinitro; 2,6-dichloro-4-nitro; 2,4-dichloro; and the like.

In the foregoing reaction equation, R' represents an alkyl or aryl substituent on a tertiary amine.

Thus in the present process, diaryl oxalates are prepared by the reaction of 1 mole of tetrachloroethylene carbonate with two moles of phenol or substituted phenols in the presence of an amine base. Tertiary amines, including heterocyclic aromatic amines such as pyridine, are useful as bases. The reaction is conducted in an inert solvent medium, preferably a solvent in which the amine hydrochloride is insoluble since this makes separation of the oxalate product easier. Benzene is a preferred solvent medium, for this reason. The reaction proceeds at ambient temperatures, but temperature is not a critical feature.

As previously indicated, the aryl oxalates produced by the invention are useful in providing chemiluminescent light. This is described in copending, commonly assigned applications Ser. Nos. 619,140, Feb. 28, 1967; 886,406, filed Dec. 18, 1969; and 842,134, filed July 16, 1969.

Light emission is obtained by the reaction of a diaryl oxalate with hydrogen peroxide in the presence of a fluorescer. The light intensity is increased substantially with increased substitution of electronegative groups. Ethyl benzoate can be used as solvent with t-butyl alcohol or 3-methyl-3-pentanol as cosolvents. A two phase system (9 parts/one part by volume) of ethyl benzoate with 30% hydrogen peroxide provides an intensely bright system. With such fluorescers as 9,10-diphenylanthracene, perylene, 9,10-bis(phenylethynyl)-anthracene and 5,12-bis-(phenylethynyl)naphthacene, blue to red emission is produced. Many other solvents and fluorescers are useful as disclosed in the above mentioned copending applications.

The hydroperoxide employed in the compositions and process of this invention may be obtained from any suitable peroxide compound. For example, the hydroperoxide may be employed as sodium peroxide. Alternatively, sodium perborate may be placed in aqueous solution whereby a solution of hydrogen peroxide is obtained. Obviously, hydrogen peroxide or its solution may be employed. The peroxide employed may be obtained from anhydrous hydrogen peroxide compounds such as perhydrate or urea (ureas peroxide), perhydrate of pyrophosphate (sodium pyrophosphate peroxide), perhydrate of histidine (histidine peroxide), sodium perborate, and the like. Still another form in which the $H_2O_2$ may be provided in the composition is that of an anhydrous solution of $H_2O_2$ in a suitable solvent such as an ether, ester, an aromatic hydrocarbon, etc. of the type which would provide a suitable diluent for the composition of this invention. Alternatively, the hydroperoxide employed in the composition or process could be any compound having a hydroperoxidic group, such as hydroperoxide (R'OOH) or a peroxy acid

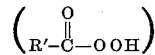

such as t-butyl hydroperoxide and perbenzoic acid. Whenever hydrogen peroxide is contemplated to be employed, any suitable compound may be substituted which will produce hydrogen peroxide.

The hydroperoxide concentration may range from about 15 molar down to about $10^{-5}$, preferably about 2 molar down to about $10^{-4}$ molar. The generic compound of this invention may be added as a solid or in admixture with a suitable solid peroxide reactant or in a suitable diluent, or alternatively dissolved directly in a solution containing the peroxide reactant.

Typical diluents within the purview of the instant discovery are those that do not readily react with a peroxide, such as hydrogen peroxide, and which do not readily react with the polycarbonyl compound or with the rearranged polycarbonyl compound.

Although the addition of water tends to quench the production of chemiluminescent light according to the present invention, water can serve as a partial diluent up to substantial major percentages (more than 50%). The term "water," as used herein, includes water-producing compounds such as hydrates.

Any one or more suitable diluents may be included with or in the place of the water, as long as the peroxide employed is at least partially soluble in one or more of the diluent(s), such as, for example, at least one gram of $H_2O_2$ per liter of diluent. The following are typical illustrative examples of the diluents or solvents which may be singly or jointly employed: non-cyclic or cyclic ethers, such as diethyl ether, diamyl ether, diphenyl ether, anisole, tetrahydrofuran, dioxane, and the like; esters such as ethyl acetate, propyl formate, amyl acetate, dimethyl phthalate, diethyl phthalate, methyl benzoate, and the like; aromatic hydrocarbons, such as benzene, xylene, toluene, and the like, acids such as acetic or propionic acids.

The fluorescent compounds contemplated herein are numerous; and they may be defined broadly as those which do not readily react on contact with the peroxide employed in this invention, such as hydrogen peroxide; likewise, they do not readily react on contact with the generic compound of this invention. Typical suitable fluorescent compounds for use in the present invention are those which have a spectral emission falling between 330 millimicrons and 800 millimicrons and which are at least partially soluble in any of the above diluents, if such diluent is employed. Among these are the conjugated polycyclic aromatic compounds having at least 3 fused rings; such as: anthracene, substituted anthracene, benzanthracene, phenanthracene, substituted phenanthracene, naphthacene, substituted naphthacene, pentacene, substituted pentacene, and the like. Typical substituents for all of these are phenyl, lower alkyl, chlorine, bromine, cyano alkoxy ($C_1$–$C_{16}$), and other like substituents which do not interfere with the light-generation reaction contemplated herein.

Numerous other fluorescent compounds having the properties given hereinabove are well known in the art. Many of these are fully described in "Fluorescence and Phosphorescence," by Peter Pringsheim, Interscience Publishers, Inc. New York, 1949. Other fluorescers are described in "The Colour Index," Second edition, volume 2, The American Association of Textile Chemists and Colorists, 1956, pp. 2907–2923. While only typical fluorescent compounds are listed hereinabove, the person skilled in the art is fully aware of the fact that this invention is not so restricted and that numerous other fluorescent compounds having similar properties are contemplated for use herein.

It has been found that the molar (moles per liter of diluent) concentrations of the major components of the novel composition herein described may vary considerably. It is only necessary that components be in sufficient concentration to obtain chemiluminescence. The molar concentration of oxalate normally is in the range of at least about $10^{-7}$ molar, preferably in the range of at least about $10^{-4}$ to about 5 molar; the fluorescent compound is present in the range from about $10^{-5}$ to about 5, preferably about $10^{-4}$ to about $10^{-1}$ molar; and the diluent must be present in a sufficient amount to form at least a partial solution of the reactants involved in the chemiluminescent reaction. There is no known maximum limit on the concentration of the oxalate compound of this invention which may be employed in the reaction, and as discussed above, intense chemiluminescent light may be obtained by employment of the high concentrations.

The ingredients of the composition of this invention may be admixed in a single stage of admixing or in a sequence of steps of admixing ingredients together or separately. Accordingly, alternative compositions may be prepared which may be stored over a period of time and which may be admixed with the final ingredient at a time when the chemiluminescent lighting is desired. For example, one such composition would be a composition which includes an oxalate compound of this invention and a fluorescent compound but which does not include a peroxide compound. Another alternative solid composition would be a composition which includes a peroxide, but which does not include the fluorescent compound. Another alternative composition would be a solid composition which includes a solid oxalate compound of this invention and a solid hydroperoxide compound, and which possibly additionally includes a solid fluorescent compound, but which does not include a diluent. Obviously, the preferred compositions which would be less than all necessary components to produce a chemiluminescent light would be a composition which would be substantially stable to a practical degree over an extended period of time; otherwise, there would be no real advantage in forming a chemiluminescent reactant to be employed in a subsequent chemiluminescent reaction.

The wavelength of the light emitted by chemiluminescence of the composition of this invention, i.e., the color of the light emitted, may be varied by the addition of any one or more energy transfer agents (fluorescers) such as the known fluorescent compounds discussed at length above.

The wavelength of the light emitted by the composition of this invention will vary, depending upon the particular fluorescent component employed in the reaction.

Although in the process of obtaining chemiluminescent light according to this invention, it is normally not necessary to employ a specific order to sequence of steps in the adding of the individual ingredients of the inventive chemiluminescent composition, it has been found that the fluorescent component preferably should be already in the reaction mixture at the time of addition of the last component necessary to bring about the chemical reaction and the concurrent release of chemical energy.

Additionally, it has been found that the superior intensity of chemiluminescence is obtained when the final mixture producing the luminescence is maintained at a temperature of between about $-40°$ C. and $100°$ C., preferably between about $20°$ C. and $50°$ C., the luminescence of applicant's process is not limited to these ranges and temperature is not critical.

The life time and the intensity of the chemiluminescent light can be regulated by the use of certain regulators. such as (1) By the addition of weak bases to the chemiluminescent composition to increase intensity. Both the strength and the concentration of the base are critical for purposes of exactness in regulation.

(2) By the variation of hydroperoxide. Both the type and the concentration of hydroperoxide are critical for the purposes of exactness in regulation.

The following examples are intended to illustrate the present invention and are in no way intended to limit the invention except as limited in the appended claims.

EXAMPLE I

Bis(6-carbopentoxy-2,4,5-trichlorophenyl)oxalate

A solution of 2.02 g. (0.02 mole) of triethyl amine and 5 ml. of benzene was added dropwise to a solution of 6.23 g. (0.02 mole) of pentyl 3,5,6-trichlorosalicylate, 2.26 g. (0.01 mole) of tetrachloroethylene carbonate and 50 ml. of benzene. The mixture was stirred at room temperature for two hours and filtered. Evaporation at 60°/60 mm. gave an oil, which solidified on standing. The material was dissolved in 40 ml. of hexane and cooling gave 1.9 g. of oxalate, M.P. 82–85°. Another 1.5 g. of product was isolated from the filtrate. Total yield was 3.4 g. or 47%.

EXAMPLE II

Bis(2,4,6-trichlorophenyl)oxalate

A solution of 1.58 g. (0.02 mole) of pyridine and 5 ml. of benzene was added dropwise to a solution of 2.26 g. (0.01 mole) of tetrachloroethylene carbonate, 3.95 g. (0.02 mole) of trichlorophenol and 50 ml. of benzene. The mixture was stirred at room temperature for 3 hours and filtered. Evaporation of the filtrate gave a colorless solid, which was treated with 100 ml. of boiling hexane. Filtration gave 2.6 g. of solid, which was recrystallized from benzene. Yield of oxalate, M.P. 190–192° was 2.1 g. or 40%.

I claim:
1. A method for preparing bisaryl oxalates of the formula

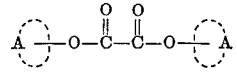

wherein

represents an aryl or substituted aryl radical, which comprises reacting tetrachloroethylene carbonate with an aromatic or substituted aromatic alcohol in the presence of an amine base.

2. The method of claim 1, wherein said aromatic alcohol is phenol.

3. The method of claim 1 wherein said aromatic alcohol is a phenol substituted with an electronegative substituent.

4. The method of claim 1 wherein the amine base is a tertiary amine.

5. The method of claim 4 wherein said amine base is pyridine.

6. The method of claim 1 wherein the reaction is conducted in an inert solvent.

7. The method of claim 6 wherein the solvent is benzene.

8. The method of claim 1 wherein said aromatic alcohol has a positive Hammett sigma value.

References Cited

UNITED STATES PATENTS 2,816,287   12/1957   Ellingboe et al. __ 260—526 UX

JAMES A. PATTEN, Primary Examiner

U.S. Cl. X.R.

252—301.2 R